Dec. 20, 1955
J. LATZEN
2,727,768
BALL JOINTS
Filed June 24, 1952
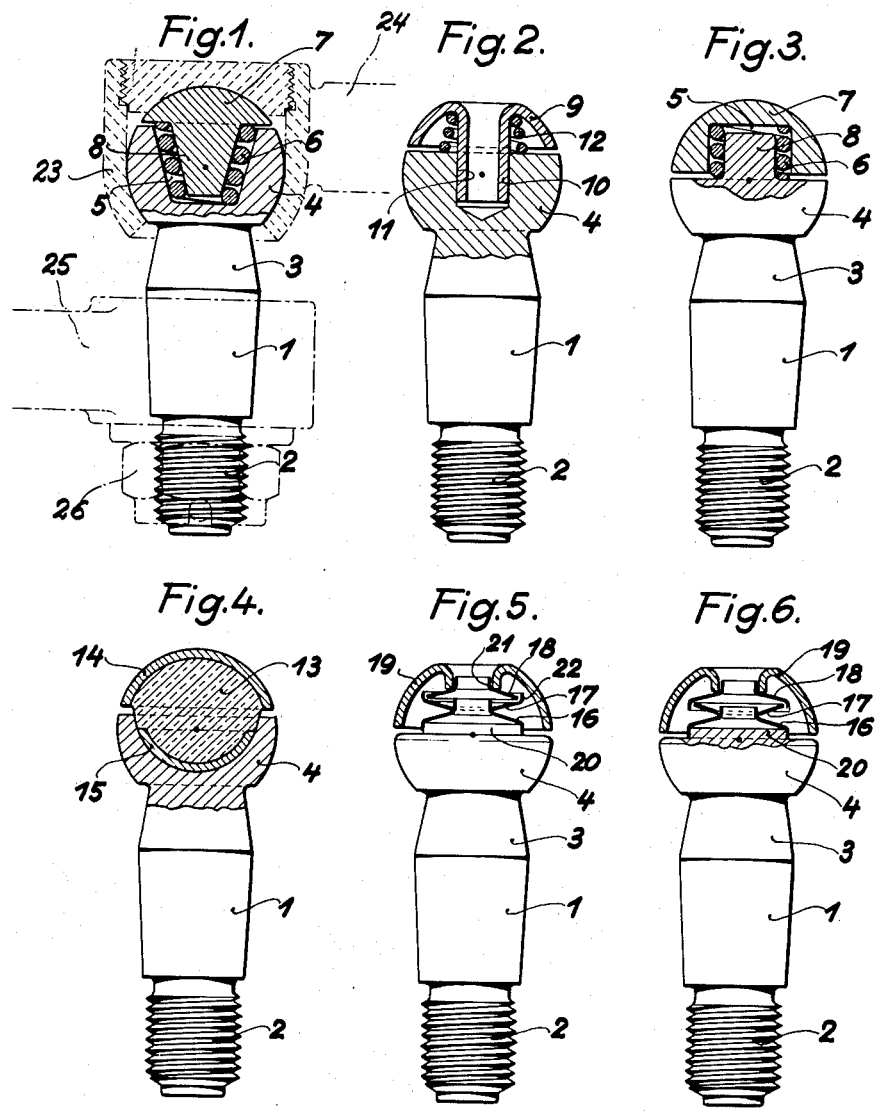
INVENTOR.
Josef Latzen
BY
E J Freeman
Attorney

United States Patent Office 2,727,768
Patented Dec. 20, 1955

2,727,768

BALL JOINTS

Josef Latzen, Dusseldorf-Oberkassel, Germany, assignor to A. Ehrenreich & Cie, Dusseldorf-Oberkassel, Germany, a firm Application June 24, 1952, Serial No. 295,250

4 Claims. (Cl. 287—90)

The present invention relates to ball pivots, and more particularly to ball pivots which are used for steering rods of motor vehicles. The ball head of such ball pivots has some play in the direction of the axis, which is compensated elastically by a spring element, which may act either on the ball head immediately or on a plate supporting said head. The conventional ball pivots have the disadvantage that their joints are of relatively large sizes.

To overcome this disadvantage the spring element of such a ball and socket joint is in accordance with this invention disposed in a divided ball head, the portions of which make up a whole ball. In this way the spring element does not require additional space so that the overall height of the joint is considerably reduced.

The spring element may be arranged in the ball head in different ways. For example, a conical or cylindrical compression spring may be disposed between the ball pivot and a hollow upper ball portion. In this case the upper portion may have a projecting piece extending into a corresponding set-off of the ball pivot. Instead, of course, the ball pivot itself may have such a projecting piece.

Of particular advantage is a construction in which a hollow drawn upper ball portion has a hollow projecting piece extending into a bore of the ball pivot, a spring element being laid into the hollow space of the upper ball portion around said hollow projecting piece. Instead of a steel spring, a rubber buffer may be disposed between the ball pivot and the upper ball portion, said buffer being fastened by vulcanizing between the calotte-shaped upper ball portion and another calotte to be laid into the ball pivot.

In another construction, one or several cup springs are disposed between the ball pivot and a hollow upper ball portion. Such springs, too, are of sufficient elasticity.

In addition to the small overall height, such a construction of a ball pivot offers another great advantage in that the ball pivots may be made by a pressing process, as it is not necessary for the ball pivot to be provided with a whole ball. The manufacture of such pivots, therefore, is considerably simplified and rendered more economic.

These and other objects of the invention will be apparent from the detailed description of the invention taken together with the appended drawing and claims.

The ball pivot consists as is known in the art of a cone-shaped central portion 1, a lower threaded portion 2, and a neck 3. In all the constructions shown in Figures 1–6 of the drawing the pivot is provided at its upper end with a lower ball portion 4. The ball portion 4 is inserted in a ball socket 23 which is supported by a holder 24. On the lower threaded portion 2 of the ball pivot is slid a bar 25 which is retained in its position by a screw nut 26.

In the construction according to Figure 1, the lower ball portion 4 has a conical interior bore 5 into which is laid a cone-shaped compression spring 6. The upper ball portion 7 has a projecting piece 8 extending into the interior of the spring 6. Said spring presses asunder the upper ball portion 7 and the lower ball portion 4, and in this way gives the joint the elasticity required to absorb shocks.

A cylindrically coiled spring 6 may as well be used in this construction, such spring requiring a cylindrical bore of the lower ball portion 4 and, accordingly, a cylindrical projecting piece 8 of the upper ball portion 7.

The projecting piece 8 may as well be disposed on the lower ball portion 4, the upper ball portion 7 then being provided with the bore 5, as shown in Figure 3.

In the construction according to Figure 2, there is used a hollow drawn upper ball portion 9 with a hollow projecting piece 10 for an analogous bore 11 of the lower ball portion 4. A spring 12 coiled into any form may in this construction be inserted into the hollow space of the upper ball portion.

According to Figure 4, a rubber buffer 13 is used instead of a spring. The rubber buffer is fastened to the calotte-shaped upper ball portion 14 and the lower ball portion 4 by vulcanizing; according to Figure 4 a calotte-shaped element 15 is laid into the lower ball portion which element is connected to the rubber buffer 13 by vulcanizing.

Figure 5 shows the use of several cup springs 16, 17, and 18 inserted between the hollow upper ball portion 19 and the lower ball portion 4 which has a short cylindrical projecting piece 20 serving to guide the lowermost cup 16. The upper cup 18 has a neck 21 extending into an opening of the upper ball portion. The cup springs are retained in their position by means of a guide edge 22 of the central cup 17.

Figure 6 shows lower and upper cups 16 and 18 of equal shape with a simple plate spring 17 interposed.

It is an essential feature of the invention that the springs are disposed within the ball head itself so that the two portions of the ball are elastically connected.

I claim:

1. A ball pivot, particularly for steering rods of motor vehicles or the like, comprising a ball head divided into a lower and an upper portion, said portions making up a whole ball, a cavity provided in at least one of said portions and a series of superposed cup springs arranged within said cavity and co-operating between said portions for pressing said portions asunder, a projection formed on said lower portion and projecting into said cavity and forming a seat for supporting and centering the lowermost of said springs.

2. A ball pivot, particularly for steering rods of motor vehicles or the like, comprising a ball head divided into a lower and an upper portion, said portions making up a whole ball, a cavity provided in at least one of said portions and a series of superposed cup springs arranged within said cavity and co-operating between said portions for pressing said portions asunder, the topmost of said springs including a centrally providing neck, said upper portion having a central aperture, said neck protruding through said aperture and being centered and guided thereby.

3. A ball pivot for the steering rods of motor vehicles comprising a ball head divided into a lower and an upper portion said two portions making up a ball, said lower portion enclosing a downwardly size-reduced centrally located cavity, said upper portion being provided with a projection shaped to form a circular cavity therebetween and said lower ball head portion and a series of superposed cup springs located in said cavity and cooperating between said upper and lower ball head portion for pressing the same asunder.

4. A ball pivot for the steering rods of motor vehicles comprising a ball head divided into a lower and an upper portion, said two portions making up a ball, said upper portion enclosing a circular centrally located recess, said lower portion being provided with a circular upwardly extending projection reaching into said circular recess of the upper portion to form a circular cavity between said two portions and a series of superposed cup springs located in said cavity and cooperating between said upper and lower ball head portion for pressing the same asunder.

References Cited in the file of this patent

UNITED STATES PATENTS

| | | |
|---|---|---|
| 782,330 | Foster | Feb. 14, 1905 |
| 1,673,268 | Rouanet | June 12, 1928 |
| 2,108,814 | Flumerfelt | Feb. 22, 1938 |
| 2,271,293 | Flumerfelt | Jan. 27, 1942 |
| 2,571,281 | Neher | Oct. 16, 1951 |

FOREIGN PATENTS

| | | |
|---|---|---|
| 465,265 | Canada | May 23, 1950 |
| 545,897 | Great Britain | June 17, 1942 |
| 852,478 | Germany | Oct. 16, 1952 |